United States Patent
Deng et al.

(10) Patent No.: US 9,948,667 B2
(45) Date of Patent: *Apr. 17, 2018

(54) SIGNATURE RULE PROCESSING METHOD, SERVER, AND INTRUSION PREVENTION SYSTEM

(71) Applicant: Huawei Technologies Co., Ltd., Shenzhen, Guangdong (CN)

(72) Inventors: Yungang Deng, Shenzhen (CN); Kun Li, Shenzhen (CN); Nengyi Pan, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/299,785

(22) Filed: Oct. 21, 2016

(65) Prior Publication Data

US 2017/0041336 A1 Feb. 9, 2017

Related U.S. Application Data

(63) Continuation of application No. 14/548,112, filed on Nov. 19, 2014, now Pat. No. 9,479,528, which is a (Continued)

(30) Foreign Application Priority Data

Jun. 13, 2012 (CN) .......................... 2012 1 0194352

(51) Int. Cl.
*G06F 12/14* (2006.01)
*G06F 17/00* (2006.01)
*H04L 29/06* (2006.01)

(52) U.S. Cl.
CPC ...... *H04L 63/1433* (2013.01); *H04L 63/1416* (2013.01); *H04L 63/1441* (2013.01); *H04L 63/20* (2013.01); *H04L 63/1408* (2013.01)

(58) Field of Classification Search
CPC ............ H04L 63/1433; H04L 63/1441; H04L 63/1416; H04L 63/20; H04L 63/1408
(Continued)

(56) References Cited

U.S. PATENT DOCUMENTS 6,035,423 A 3/2000 Hodges et al.
6,596,981 B1 7/2003 Aswell et al.
(Continued)

FOREIGN PATENT DOCUMENTS

CN 101827104 A 9/2010
CN 101895521 A 11/2010
(Continued)

OTHER PUBLICATIONS

Xin Wang et al:Research on the Intrusion detection mechanism based on cloud computing. Intelligent Computing and Integrated Systems(ICISS), 2010 Internationrl Conference on, IEEE, Piscatawry, NJ, USA, XP031817464, Oct. 22, 2010, pp. 125-128.

Primary Examiner — Aravind K Moorthy (57) ABSTRACT

A signature rule processing method, a server, and an intrusion prevention system is provided. The method includes: performing, by a cloud server, correlation analysis on signature rule usage status information of each security device connected to the cloud server and a latest signature rule set published by the cloud server, to obtain a most active threat signature rule identification list, and sending, by the cloud server, update information to each security device to update a signature rule after generating the update information according to the most active threat signature rule identification list. The present invention is applicable to the field of network security systems.

11 Claims, 3 Drawing Sheets

Related U.S. Application Data continuation of application No. PCT/CN2013/070435, filed on Jan. 14, 2013.

(58) Field of Classification Search
USPC ..................................... 726/1, 22; 713/165
See application file for complete search history.

(56) References Cited

U.S. PATENT DOCUMENTS

| | | | |
|---|---|---|---|
| 7,353,511 B1 | 4/2008 | Ziese | |
| 7,376,969 B1 | 5/2008 | Njemanze et al. | |
| 7,921,459 B2 | 4/2011 | Houston et al. | |
| 9,479,528 B2 * | 10/2016 | Deng | H04L 63/1416 |
| 2002/0157006 A1 * | 10/2002 | Narishima | G06F 21/645 |
| | | | 713/177 |
| 2005/0076245 A1 | 4/2005 | Graham et al. | |
| 2006/0112416 A1 * | 5/2006 | Ohta | H04L 63/102 |
| | | | 726/1 |
| 2008/0034425 A1 | 2/2008 | Overcash et al. | |
| 2011/0162070 A1 | 6/2011 | Krasser et al. | |
| 2012/0304244 A1 * | 11/2012 | Xie | G06F 21/00 |
| | | | 726/1 |
| 2013/0318607 A1 * | 11/2013 | Reed | G06F 11/3062 |
| | | | 726/23 |

FOREIGN PATENT DOCUMENTS

| | | |
|---|---|---|
| CN | 102037471 A | 4/2011 |
| CN | 102111420 A | 6/2011 |
| CN | 102346828 A | 2/2012 |
| CN | 102413019 A | 4/2012 |
| CN | 102694820 A | 9/2012 |
| WO | 2011046356 A2 | 4/2011 |

* cited by examiner

SIGNATURE RULE PROCESSING METHOD, SERVER, AND INTRUSION PREVENTION SYSTEM

CROSS-REFERENCE TO RELATED APPLICATIONS

This application is a continuation of U.S. application Ser. No. 14/548,112, filed on Nov. 19, 2014, which is a continuation of International Application No. PCT/CN2013/070435, filed on Jan. 14, 2013, which claims priority to Chinese Patent Application No. 201210194352.6, filed on Jun. 13, 2012, all of which are hereby incorporated by reference in their entireties.

TECHNICAL FIELD

The present invention relates to the field of network security systems, and in particular, to a signature rule processing method, a server, and an intrusion prevention system.

BACKGROUND

With the wide application of computers and the increasing popularity of networks, more and more threats come from inside and outside of the networks, resulting in occurrence of such problems as network resource abuse, network paralysis, and user private data leakage. In order to provide effective network security protection and prevent internal and external network attacks, security devices need to be deployed in the networks, for example, an IPS (Intrusion Prevention System, intrusion prevention system), a firewall, and the like.

A signature feature scanning method is mainly adopted by current security devices to detect network attacks, viruses, worms, malicious software, and the like. By analyzing signature features of loopholes, viruses, worms, malicious software, and the like, researchers extract features to generate a signature feature library and publish the signature feature library. A security device loads signature rules according to a deployment scenario and its resource configuration, performs scanning detection according to the loaded signature rules to detect network attacks, viruses, worms, malicious software, and the like, and takes actions, for example, blocking, cleansing or alarming, against the detected attacks, viruses, worms, malicious software, and the like.

However, in the prior art, on one hand, due to CPU (Central Processing Unit, central processing unit) resource constraints and different deployment scenarios, the security device does not load all signature rules, but loads a part of the signature rules according to a configuration, and the configuration of signature rules is completely determined by an operator according to experience. On the other hand, signature rules loaded by different security devices in different industries in different areas are different, when a problem occurs, only security devices loading a corresponding signature rule are protected, while security devices not loading the corresponding signature rule are not protected. Therefore, a protection capability of security devices in the prior art is not ideal.

SUMMARY

Embodiments of the present invention provide a signature rule processing method, a server, and an intrusion prevention system, which implement sharing of signature rule information between security devices and improve a protection capability of the security devices.

An embodiment of the present invention provides a signature rule processing method, including:
receiving, by a cloud server, signature rule usage status information, which is sent by at least one security device connected to the cloud server, of each of the at least one security device, where the signature rule usage status information of a security device is used to indicate a usage status of a signature rule of the security device in a whole network;
performing, by the cloud server, correlation analysis on the signature rule usage status information of each of the at least one security device and a latest signature rule set published by the cloud server, to obtain a most active threat signature rule identification list;
generating, by the cloud server according to the most active threat signature rule identification list, update information corresponding to each of the at least one security device; and
separately sending, by the cloud server, the update information to each of the at least one security device, to drive each of the at least one security device to update a signature rule according to the update information.

An embodiment of the present invention further provides a server, including:
a receiving unit, configured to receive signature rule usage status information, which is sent by at least one security device connected to the receiving unit, of each of the at least one security device, and transmit the signature rule usage status information of each of the at least one security device to an analyzing and obtaining unit, where the signature rule usage status information of a security device is used to indicate a usage status of a signature rule of the security device in a whole network;
the analyzing and obtaining unit, configured to receive the signature rule usage status information of each of the at least one security device from the receiving unit, perform correlation analysis on the signature rule usage status information of each of the at least one security device and a latest signature rule set, to obtain a most active threat signature rule identification list, and send the most active threat signature rule identification list to a generating unit;
the generating unit, configured to receive the most active threat signature rule identification list from the analyzing and obtaining unit, generate, according to the most active threat signature rule identification list, update information corresponding to each of the at least one security device, and transmit the update information to a first sending unit; and
the first sending unit, configured to receive the update information from the generating unit, and separately send the update information to each of the at least one security device corresponding to the update information, to drive each of the at least one security device to update a signature rule according to the update information.

An embodiment of the present invention further provides an intrusion prevention system, including: a cloud server and at least one security device communicatively connected to the cloud server, where:
the cloud server is configured to receive signature rule usage status information, which is sent by each of the at least one security device connected to the cloud server, of each of the at least one security devices; perform correlation analysis on the signature rule usage status information of each of the at least one security device and a latest signature rule set published by the cloud server, to obtain a most active threat signature rule identification list; generate, according to the most active threat signature rule identification list, update information corresponding to each of the at least one security device; and separately send the update information to each of the at least one security device; and the security device is configured to send signature rule usage status information corresponding to itself to the cloud server, where the signature rule usage status information is used to indicate a usage status of a signature rule of the security device in a whole network; and update a signature rule according to update information after receiving the update information sent by the cloud server.

According to the signature rule processing method, the server, and the intrusion prevention system provided by the embodiments of the present invention, a cloud server performs correlation analysis on signature rule usage status information of each security device connected to the cloud server and a latest signature rule set published by the cloud server, to obtain a most active threat signature rule identification list, and after generating update information according to the most active threat signature rule identification list, the cloud server sends the update information to each security device to update a signature rule. In the embodiments of the present invention, the cloud server is configured to provide real-time signature rule update information to security devices to improve a protection capability of the security devices while implementing sharing of signature rule information between the security devices.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In order to make the advantages of the technical solutions of the present invention clearer, the following describes the present invention in detail with reference to the accompanying drawings and the embodiments.

Figure 1:
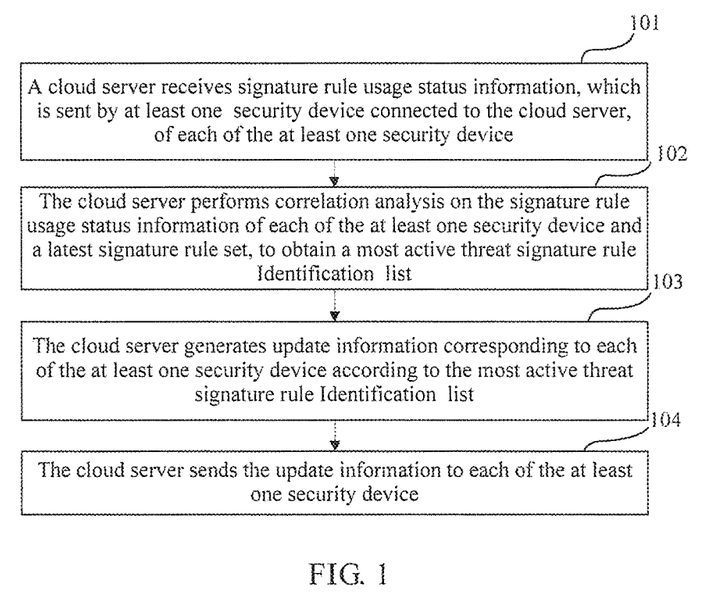
FIG. 1 is a flowchart of a signature rule processing method provided by an embodiment of the present invention.

An embodiment provides a signature rule processing method, and as shown in FIG. 1, the method includes:

101. A cloud server receives signature rule usage status information, which is sent by at least one security device connected to the cloud server, of each of the at least one security device.

The signature rule usage status information may include an identification of a signature rule, a hit count of the signature rule within a unit time, last hit time of the signature rule, a severity level of the signature rule, an area number of the signature rule, an industry number of a security device corresponding to the signature rule, and so on.

Further, the cloud server may further receive configuration data, which is sent by each security device connected to the cloud server, of each security device.

102. The cloud server performs correlation analysis on the signature rule usage status information of each of the at least one security device and a latest signature rule set, to obtain a most active threat signature rule identification list.

A standard for determining the activeness may be specifically determining according to such factors within a current time period in a current network as a hit count of a signature rule and an occurrence frequency of the signature rule.

Specifically, the cloud server may perform the correlation analysis in multiple manners, where one manner may be as follows: the cloud server obtains a first threat signature rule ID set with a relatively high use frequency in the at least one security device according to the signature rule usage status information, and obtains a second threat signature rule ID set with a high hit rate in actual network traffic according to the signature rule usage status information; and then obtains a third threat signature rule ID set with a high danger coefficient according to the latest signature rule set; and the cloud server calculates a union set of the first, second and third threat signature rule ID sets, to obtain a fourth threat signature rule ID set, and then, uses signature rules in an intersection set of the fourth threat signature rule ID set and the latest signature rule set as most active threat signature rules and generates the most active threat signature rule identification list.

103. The cloud server generates, according to the most active threat signature rule identification list, update information corresponding to each of the at least one security device.

The update information includes an ID of a security device to be updated, a name of the security device, an address of the security device, a configuration to be changed of the security device, and a signature rule ID set list or signature rule set to be updated of the security device. When the update information is the signature rule ID set list to be updated of the security device, the security device downloads a signature rule set corresponding to the signature rule ID set list from the cloud server and performs updating. When the update information is the signature rule set to be updated of the security device, the security device directly updates a signature rule according to the update information.

Preferably, the cloud server may further receive configuration data, which is sent by each security device connected to the cloud server, of each security device. In this case, the cloud server firstly obtains a loaded signature rule list of each of the at least one security device according to the configuration data of each of the at least one security device, determines, according to the loaded signature rule list of each of the at least one security device and the most active threat signature rule identification list, a security device not containing all signature rules in the most active threat signature rule identification list in the security devices as a security device with a signature rule to be updated, and generates update information corresponding to the security device with a signature rule to be updated.

For example, in the event of a large outbreak of a threat T, security devices in area A load a signature rule corresponding to the threat, and security devices in area B do not load the signature rule of the threat. The cloud server determines T as a large outbreak threat according to signature rule usage status information reported by the security devices in area A and sends update information to the security devices in area B, and the security devices in area B performs updating immediately after receiving the update information to immediately protect security of area B, thereby implementing sharing of a signature rule between different devices and different areas.

Alternatively, when the cloud server determines that a security device with an incorrect configuration exists in the security devices, the cloud server generates update information corresponding to the security device with an incorrect configuration. The incorrect configuration of the security device may be caused by a configuration conflict, a configuration leakage or an irrational configuration. For example, one security device runs a database application under Linux (operating system), and the following configuration manners are all wrong: only low-threat signature rules in the database are configured while high-threat signature rules are not configured; or configured signature rules are ineffective in the latest signature rule set; or only signature rules of the database are configured while signature rules of Linux are not configured; or signature rules of a database under Windows (operating system) are configured.

104. The cloud server separately sends the update information to each of the at least one security device.

Further, each of the at least one security device is driven to update a signature rule according to the update information.

The cloud server may automatically send the update information to the security devices so that security information is updated automatically, and may notify a technical person in such a form as an E-mail or an SMS message to manually configure the security devices and update a signature rule feature library.

Figure 5:
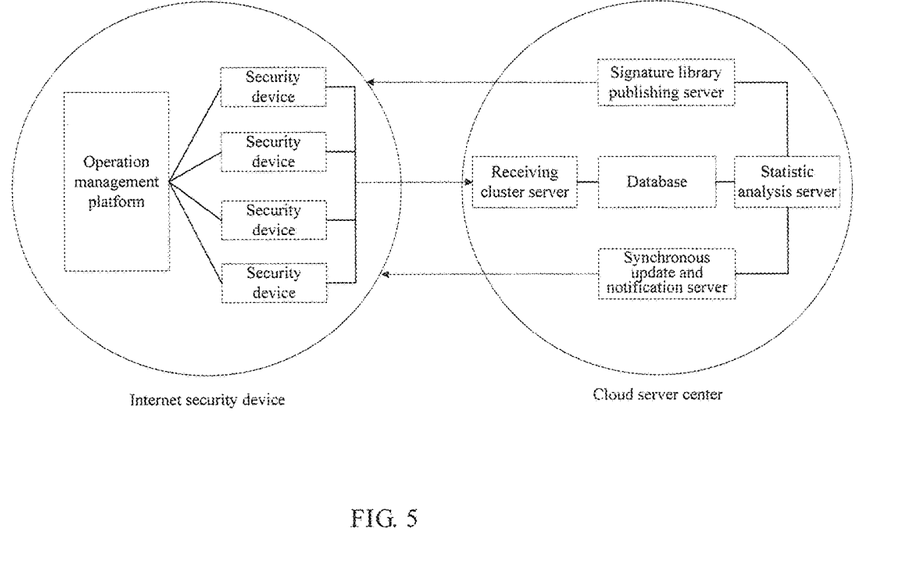
FIG. 5 is a structural diagram of system networking provided by an embodiment of the present invention.

The method provided by the embodiment of the present invention may specifically be applied in Internet security protection, and a specific structural diagram of system networking is shown in FIG. 5. The system networking may include security devices, an operation management platform for managing the security devices, and a cloud server center. The cloud server center may specifically include a receiving cluster server, a signature library publishing server, a statistic analysis server, a synchronous update and notification server, and a database.

Specifically, the operation management platform configures a loading rule and a signature rule set to be loaded for the security devices, the security devices report latest configuration data and signature rule usage status information of the security devices to the receiving cluster server in the cloud server center by using a built-in proxy, and the statistic analysis server performs correlation analysis according to the signature rule usage status information and a latest signature feature library published by the signature library publishing server, to obtain a most active threat signature rule ID list, and sends update information of a security device to be updated to the synchronous update and notification server by analyzing whether the configuration data of each security device contains the entire most active threat signature rule ID list so as to drive the synchronous update and notification server to send the update information to the security device, where the signature rule usage status information and the configuration data of the security devices may be stored in the database.

Figure 2:
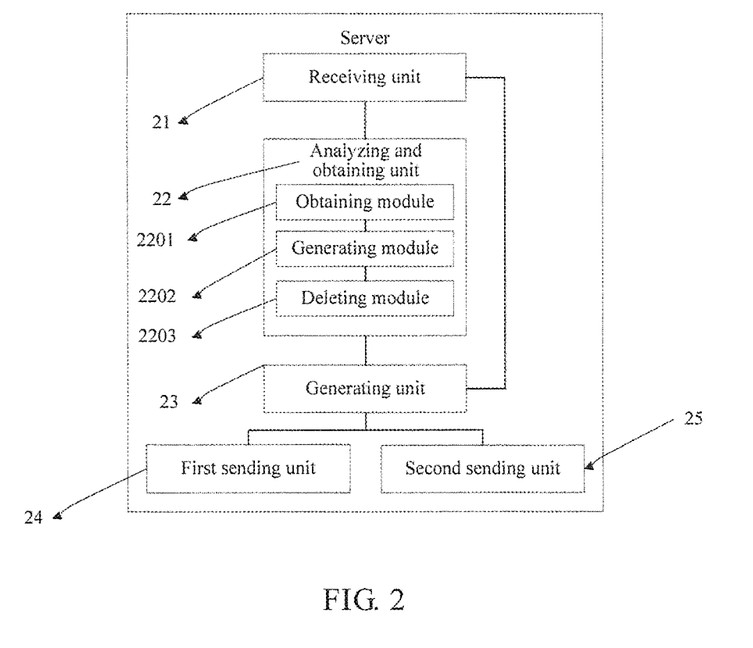
FIG. 2 is a schematic structural diagram of a server provided by an embodiment of the present invention.

An embodiment provides a server, as shown in FIG. 2, where an entity of the apparatus maybe a cloud server. The apparatus includes: a receiving unit 21, an analyzing and obtaining unit 22, a generating unit 23, a first sending unit 24, and a second sending unit 25.

The receiving unit 21 may be configured to receive signature rule usage status information, which is sent by at least one security device connected to the receiving unit 21, of each of the at least one security device, and transmit the signature rule usage status information of each of the at least one security device to the analyzing and obtaining unit 22.

The signature rule usage status information may include an identification of a signature rule, a hit count of the signature rule within a unit time, last hit time of the signature rule, a severity level of the signature rule, an area number of the signature rule, an industry number of a security device corresponding to the signature rule, and so on. The signature rule usage status information is used to indicate a usage status of a signature rule of each of the at least one security device.

The receiving unit 21 may further be configured to receive configuration data, which is sent by each security device connected to the receiving unit, of each of the at least one security device, and transmit the configuration data of each of the at least one security device to the generating unit 23.

The analyzing and obtaining unit 22 may be configured to receive the signature rule usage status information of each of the at least one security device from the receiving unit 21, perform correlation analysis on the signature rule usage status information of each of the at least one security device and a latest signature rule set, to obtain a most active threat signature rule identification list, and send the most active threat signature rule identification list to the generating unit 23.

The analyzing and obtaining unit 22 may specifically include: an obtaining module 2201, a generating module 2202, and a deleting module 2203.

The obtaining module 2201 may be configured to obtain a first threat signature rule ID set with a use frequency greater than a preset frequency in the at least one security device according to the signature rule usage status information of each of the at least one security device, obtain a second threat signature rule ID set with a hit count greater than a preset count in actual network traffic according to the signature rule usage status information, and obtain a third threat signature rule ID set with a danger coefficient greater than a preset threshold according to the latest signature rule set.

The generating module 2202 may be configured to obtain a fourth threat signature rule ID set by calculating a union set of the first threat signature rule ID set, the second threat signature rule ID set, and the third threat signature rule ID set that are sent by the obtaining module 2201, and transmit the fourth threat signature rule ID set to the deleting module 2203.

The deleting module 2203 may be configured to receive the fourth threat signature rule ID set sent by the generating module 2202, use signature rules in an intersection set of the fourth threat signature rule ID set and the latest signature rule set as most active threat signature rules, and generate the most active threat signature rule identification list.

The generating unit 23 may be configured to receive the most active threat signature rule identification list from the analyzing and obtaining unit 22, generate, according to the most active threat signature rule identification list, update information corresponding to each of the at least one security device, and transmit the update information to the first sending unit 24.

The generating unit 23 maybe specifically configured to receive configuration information of each of the at least one security device sent by the receiving unit 21, obtain a loaded signature rule list of each of the at least one security device according to the configuration data of each of the at least one security device, determine a security device with a signature rule to be updated by comparing the loaded signature rule list of each of the at least one security device with the most active threat signature rule identification list, generate update information corresponding to the security device with a signature rule to be updated, and transmit the update information to the second sending unit 25.

The first sending unit 24 may be configured to receive the update information from the generating unit 23, and separately send the update information to each security device corresponding to the update information, to drive each of the at least one security device to update a signature rule according to the update information.

The second sending unit 25 may be configured to receive the update information from the generating unit 23, and send the update information to the security device with a signature rule to be updated, to drive the security device with a signature rule to be updated to update a signature rule according to the update information.

Figure 3:
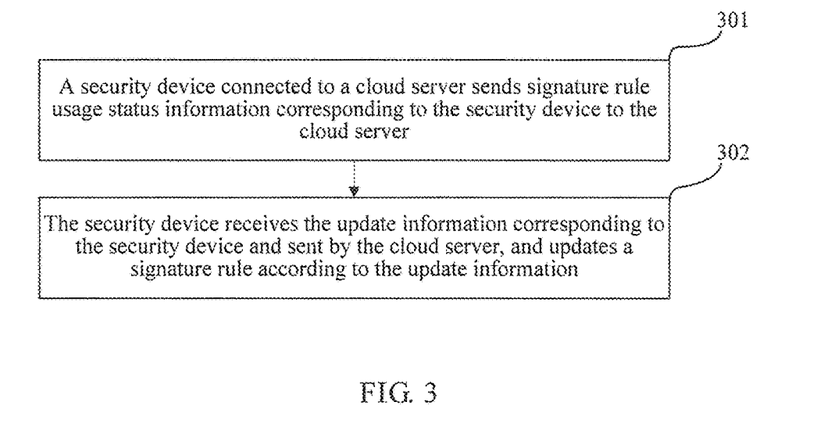
FIG. 3 is a flowchart of another signature rule processing method provided by an embodiment of the present invention.

An embodiment provides another signature rule processing method, as shown in FIG. 3, and the method includes:

301. A security device connected to a cloud server sends signature rule usage status information corresponding to the security device to the cloud server.

The signature rule usage status information may include an identification of a signature rule, a hit count of the signature rule within a unit time, last hit time of the signature rule, a severity level of the signature rule, an area number of the signature rule, an industry number of a security device corresponding to the signature rule, and so on.

Preferably, the security device may further send configuration data of the security device to the cloud server, to drive the cloud server to determine, according to the configuration data of the security device and a most active threat signature rule identification list, a security device with a signature rule to be updated, and generate update information corresponding to the security device with a signature rule to be updated.

Further, the cloud server is driven to generate update information corresponding to the security device after obtaining the most active threat signature rule identification list according to the signature rule usage status information corresponding to the security device and a latest signature rule set published by the cloud server, where the signature rule usage status information is used to indicate a usage status of a signature rule of the security device in a whole network.

302. The security device receives the update information corresponding to the security device and sent by the cloud server, and updates a signature rule according to the update information.

The update information includes an ID of the security device to be updated, a name of the security device, an address of the security device, a configuration to be changed of the security device, and a signature rule ID set list or signature rule set to be updated of the security device.

Figure 4:
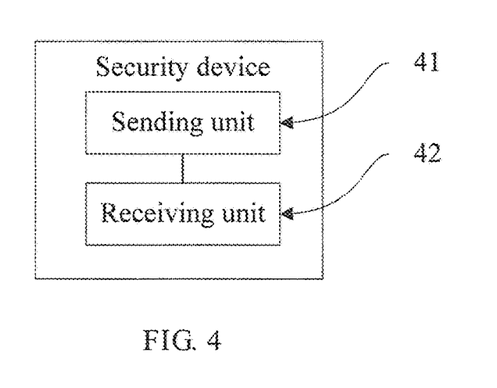
FIG. 4 is a schematic structural diagram of a security device provided by an embodiment of the present invention.

An embodiment provides a security device, where an entity of the apparatus may be a network security device, as shown in FIG. 4, and the apparatus includes: a sending unit 41 and a receiving unit 42.

The sending unit 41 may be configured to send signature rule usage status information to a cloud server.

The signature rule usage status information may include an identification of a signature rule, a hit count of the signature rule within a unit time, last hit time of the signature rule, a severity level of the signature rule, an area number of the signature rule, an industry number of a security device corresponding to the signature rule, and so on.

Further, the cloud server is driven to generate update information according to the signature rule usage status information and configuration data, where the signature rule usage status information is used to indicate a usage status of a signature rule.

The sending unit 41 may further be configured to send the configuration data of the security device to the cloud server, to drive the cloud server to determine, according to the configuration data of the security device and the most active threat signature rule identification list, a security device with a signature rule to be updated, and generate update information corresponding to the security device with a signature rule to be updated.

The receiving unit 42 may be configured to receive the update information sent by the cloud server, and update a signature rule according to the update information.

The update information includes an ID of the security device to be updated, a name of the security device, an address of the security device, a configuration to be changed of the security device, and a signature rule ID set list or signature rule set to be updated of the security device.

Figure 6:
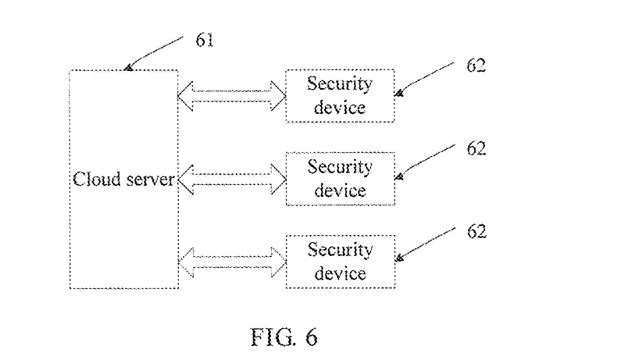
FIG. 6 is a schematic structural diagram of an intrusion prevention system provided by an embodiment of the present invention.

An embodiment further provides a security device intrusion prevention system, as shown in FIG. 6, including: a cloud server 61 and at least one security device 62 communicatively connected to the cloud server.

The cloud server 61 is configured to receive signature rule usage status information, which is sent by each of the at least one security device connected to the cloud server, of each of the at least one security device; perform correlation analysis on the signature rule usage status information of each of the at least one security device and a latest signature rule set published by the cloud server, to obtain a most active threat signature rule identification list; generate, according to the most active threat signature rule identification list, update information corresponding to each of the at least one security device; and separately send the update information to each of the at least one security device.

The security device 62 is configured to send signature rule usage status information corresponding to itself to the cloud server 61, where the signature rule usage status information is used to indicate a usage status of a signature rule of the security device in a whole network; and update a signature rule according to the update information after receiving the update information sent by the cloud server 61.

According to the signature rule processing method, the server, and the intrusion prevention system provided by the embodiments of the present invention, a cloud server performs correlation analysis on signature rule usage status information of each of the at least one security device connected to the cloud server and a latest signature rule set published by the cloud server, to obtain a most active threat signature rule identification list, and after generating update information according to the most active threat signature rule identification list, the cloud server sends the update information to each of the at least one security device to update a signature rule. In the embodiments of the present invention, the cloud server is configured to provide real-time signature rule update information to security devices to improve a protection capability of the security devices while implementing sharing of signature rule information between the security devices.

The server provided by the embodiments of the preset invention is capable of implementing the foregoing provided method embodiments, and for detailed function implementation, reference may be made to descriptions in the method embodiments, which are not further described herein. The signature rule processing method, the server, and the intrusion prevention system provided by the embodiments of the present invention are applicable to the field of network security systems, but are not limited to this.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disc, an optical disc, a read-only memory (Read-Only Memory, ROM), or a random access memory (Random Access Memory, RAM).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signature rule processing method, comprising:
   sending, by a first security device, signature rule usage status information to a cloud server, wherein the signature rule usage status information indicates a usage status of a signature rule set configured in the first security device;
   receiving, by the first security device, update information from the cloud server, wherein the update information is generated by performing correlation analysis on the signature rule usage status information of the first security device and signature rule usage status information of a second security device;
   updating, according to the update information, the signature rule set configured in the first security device;
   wherein the update information is generated according to a most active threat signature rule identification list and a latest signature rule set published by the cloud server; the most active threat signature rule identification list is determined from a first threat signature rule ID set with a use frequency greater than a preset frequency, a second threat signature rule ID set with a hit count greater than a preset count in network traffic, and a third threat signature rule ID set with a danger coefficient greater than a preset threshold; and
   the first threat signature rule ID set, the second threat signature rule ID set, and the third threat signature rule ID set are determined according to the signature rule usage status information of the first security device and the second security device.

2. The signature rule processing method according to claim 1, wherein the signature rule usage status information comprises at least one of: an identification of a signature rule, a hit count of the signature rule within a unit time, last hit time of the signature rule, or a severity level of the signature rule.

3. The signature rule processing method according to claim 1, further comprising:
   sending, by the first security device, configuration data to the cloud server, wherein the configuration data indicates a signature rule set loaded by the first security device; and
   wherein the update information is generated by comparing the most active threat signature rule identification list and the signature rule set loaded by the first security device.

4. The signature rule processing method according to claim 1, wherein the update information comprises at least one signature rule to be updated.

5. A security device, comprising:
   a processor; and
   a non-transitory processor-readable memory coupled to the processor through a bus, wherein the memory is configured to store an executable program code which, when executed by the processor, causes the security device to:
   send signature rule usage status information to a cloud server, wherein the signature rule usage status information indicates a usage status of a signature rule set configured in the security device;
   receive update information sent by the cloud server, wherein the update information is generated by performing correlation analysis on the signature rule usage status information of the security device and signature rule usage status information of another device; and
   update, according to the update information, the signature rule set configured in the security device;
   wherein the update information is generated according to a most active threat signature rule identification list and a latest signature rule set published by the cloud server; the most active threat signature rule identification list is determined from a first threat signature rule ID set with a use frequency greater than a preset frequency, a second threat signature rule ID set with a hit count greater than a preset count in network traffic, and a third threat signature rule ID set with a danger coefficient greater than a preset threshold; and
   the first threat signature rule ID set, the second threat signature rule ID set, and the third threat signature rule ID set are determined according to the signature rule usage status information of the first security device and the second security device.

6. The security device according to claim 5,
   wherein the executable program code, when executed by the processor, causes the security device to: send configuration data to the cloud server, wherein the configuration data indicates a signature rule set loaded by the security device; and
   the update information is generated by comparing the most active threat signature rule identification list and the signature rule set loaded by the security device.

7. A signature rule processing method, comprising:
   receiving, by a cloud server, signature rule usage status information of at least one security device connected to the cloud server, wherein the signature rule usage status information of the at least one security device is used to indicate a usage status of signature rules of the at least one security device;
   performing, by the cloud server, correlation analysis on the signature rule usage status information to obtain a most active threat signature rule identification list that is determined according to use frequency, hit count and danger coefficient of the signature rules;
   generating, by the cloud server, according to the most active threat signature rule identification list and a latest signature rule set published by the cloud server, update information corresponding to the at least one security device; and sending, by the cloud server, the update information to the at least one security device, wherein the update information is used to update the signature rules of the at least one security device.

8. The signature rule processing method according to claim 7, further comprising:

receiving, by the cloud server, configuration data sent by the at least one security device connected to the cloud server, wherein the configuration data of the at least one security device is used to indicate signature rule loading information of the at least one security device; and generating the update information corresponding to the at least one security device comprises:

obtaining, by the cloud server, a loaded signature rule list of each respective security device of the at least one security device according to the configuration data of the respective security device, determining a target security device with a signature rule to be updated by comparing the loaded signature rule list of the respective security device with the most active threat signature rule identification list, and generating update information corresponding to the target security device.

9. The signature rule processing method according to claim 8, wherein determining the target security device comprises:

determining, according to the loaded signature rule list of the respective security device and the most active threat signature rule identification list, a security device not containing all signature rules in the most active threat signature rule ID list as the target security device with a signature rule to be updated.

10. A cloud server, comprising:

a processor; and a non-transitory processor-readable memory coupled to the processor through a bus, wherein the memory is configured to store an executable program code which, when executed by the processor, causes the server to:

receive signature rule usage status information of at least one security device connected to the cloud server, wherein the signature rule usage status information of the at least one security device is used to indicate a usage status of signature rules of the at least one security device, perform correlation analysis on the signature rule usage status information to obtain a most active threat signature rule identification list, wherein the most active threat signature rule identification list is determined according to use frequency, hit count and danger coefficient of the signature rules, generate, according to the most active threat signature rule identification list and a latest signature rule set published by the cloud server, update information corresponding to the at least one security device, and send the update information to the at least one security device, wherein the update information is used to update the signature rules of the at least one security device.

11. The cloud server according to claim 10, wherein the executable program code, when executed by the processor, further causes the cloud server to:

receive configuration data sent by the at least one security device connected to the cloud server, wherein the configuration data of the at least one security device is used to indicate signature rule loading information of the at least one security device;

obtain a loaded signature rule list of each respective security device of the at least one security device according to the configuration data of the respective security device; and determine a target security device with a signature rule to be updated by comparing the loaded signature rule list of the respective security device with the most active threat signature rule identification list, and generate update information corresponding to the target security device.

* * * * *